US005955208A

United States Patent [19]

Takahashi

[11] Patent Number: 5,955,208

[45] Date of Patent: Sep. 21, 1999

[54] KNIVES FOR SLICERS

[75] Inventor: Masao Takahashi, Miyagi-ken, Japan

[73] Assignee: Toyo Hamono Co. Ltd., Miyagai-Ken, Japan

[21] Appl. No.: 09/191,712

[22] Filed: Nov. 13, 1998

[30] Foreign Application Priority Data

Nov. 17, 1997 [JP] Japan .................................... 9-314798

[51] Int. Cl.[6] .............................. B23B 15/00; B27C 1/00; B27G 13/00

[52] U.S. Cl. ................... 428/685; 144/162.1; 144/181.2; 144/218; 144/241; 428/116; 428/285

[58] Field of Search ................................ 144/162.1, 175, 144/181.2, 184, 190, 218, 241; 428/116, 285, 685; 420/41, 42, 63

[56] References Cited

U.S. PATENT DOCUMENTS

| | | | |
|---|---|---|---|
| 13,485 | 9/1855 | Bisbee | 144/181.2 |
| 1,787,994 | 1/1931 | Miller | 144/181.2 |
| 1,828,973 | 10/1931 | Miller | 244/181.2 |
| 4,255,497 | 3/1981 | Bono | 428/685 |
| 5,134,011 | 7/1992 | Kamiya et al. | 428/116 |

*Primary Examiner*—W. Donald Bray
*Attorney, Agent, or Firm*—Heslin & Rothenberg, P.C.

[57] ABSTRACT

Disclosed is knives for slicers used to slice a veneer 3A which is composed of a flat base steel 1 and a flat edge steel 2 brazed to the base steel 1. The base steel 1 is formed of ferritic stainless steel including improved steel such as SUS 430 (16 Cr–18 Cr) and the edge steel 2 is formed of alloy tool steel, high speed tool steel including improved steel of SKH or a material corresponding to high speed tool steel. With this arrangement, the stain of a veneer caused by the rust of the knives can be prevented and the durability of the knives can be improved.

2 Claims, 2 Drawing Sheets

KNIVES FOR SLICERS

BACKGROUND OF THE INVENTION

1. Field of the Invention

The present invention relates to slicing of a veneer, and more specifically, to a knife for slicers for preventing the occurrence of rust (iron oxide) resulting from the reaction of tannic acid contained in sap with the iron in the knife.

2. Description of the Related Art

A knife for slicers is used to slice a veneer to be bonded to plywood and a veneer used as a material for laminated wood and the like from wood in such a manner that the knife is mounted on the tool post of slicers and the tool post is reciprocated. Conventional knives for slicers have such a structure that an edge steel is brazed to a base steel. In many cases, the base steel is formed of mild steel, and the edge steel is formed of alloy tool steel such as die steel and the like. When a veneer is sliced from a Japanese oak material or an oak material, there is caused a phenomenon called blue stain, whereby rust (ion oxide) is produced by the reaction of tannic acid contained in the sap of wood with the iron in the knives for slicers. When the blue stain occurs, treatment such as the bleaching of a stained veneer with oxalic acid and the like is necessary. Thus, there is required a measure for preventing the blue stain. In Japan, there have been employed various kinds of measures such as Teflon coating, hard chromium plating and paint coating to the surface of knives for slicers and the like as a blue stain preventing measure.

On the other hand, since a knife for slicers is a flat and large elongated the knife and used to accurately slice a veneer having a prescribed thickness from wood, it is preferable that the knife is composed of a material which does not produce rust by the reaction thereof with sap. Further, when the knife slices a considerable amount of veneers, wear, burr, chipping and the like are caused to the edge steel of the knife. To make the edge steel acute by removing the wear, burr, chipping and the like, therefor, it is subjected to a grinding job while it is held on an electromagnetic chuck by electromagnetic force. Since the grinding job is repeated periodically, the grinding job must be effectively executed by permitting the job to be set up easily.

Since the base steel of the conventional knives for slicers is formed of mild steel, the knives stain a veneer by the rust resulting from the reaction of the base steel with sap. Therefore, there must be taken a measure for bleaching a stained veneer or coating the surface of the edge steel to prevent the veneer from being stained.

An object of the present invention is to provide knives for slicers capable of preventing the stain of a veneer caused by rust produced to the surface of an edge steel and improving the durability of the knives.

SUMMARY OF THE INVENTION

To achieve the above object, the present invention is characterized in a knife for slicers for slicing a veneer, which is composed of a base steel and an edge steel brazed to the base steel, wherein the base steel is composed of ferritic stainless steel.

In this case, it is preferable to use high-speed tool steel or a material corresponding to high-speed tool steel including improved steel such as SKH 51, 52 and the like as the edge steel brazed to the base steel formed of ferritic stainless steel.

The material corresponding to high-speed tool steel means steel composed of a component which is intermediate between high-speed tool steel and alloy tool steel and it is usually called semi-high-speed steel.

As described above, according to the present invention, since the base steel is formed of ferritic stainless steel, the occurrence of rust can be prevented when a veneer is sliced. Further, since ferritic stainless steel is a magnetic body, the base steel can be held on an electromagnetic chuck by electromagnetic force when the edge steel is ground. However the base steel is also heated to the quenching temperature of the edge steel in brazing, since the base steel formed of ferritic stainless steel without a hardening property due to quenching is not quenched even if it is heated to the quenching temperature, strain-correction can be easily carried out after heat treatment and the flatness of the edge steel can be also improved. When, for example, austenitic stainless steel which is a non-magnetic body is selected as the material of the base steel, an additional fixture jig and the like are necessary because the base steel cannot be held on an electromagnetic chuck by electromagnetic force. As a result, the set-up of the grinding job is made complex. Further, since martensitic stainless steel has the hardening property due to quenching, a measure for the strain of the base steel has a problem. Therefore, ferritic stainless steel is selected as the material of the base steel in consideration of the conditions that the base steel is not hardened by quenching when brazing is executed in order to secure flatness, and that a cost is not increased by the material. Further, since high-speed tool steel or the material corresponding to high-speed tool steel (semi-high-speed steel) which is more durable than alloy tool steel is employed as the material of the edge steel, the durability of the edge steel can be improved as compared with the conventional knives for slicers.

DESCRIPTION OF THE PREFERRED EMBODIMENT

Figure 1:
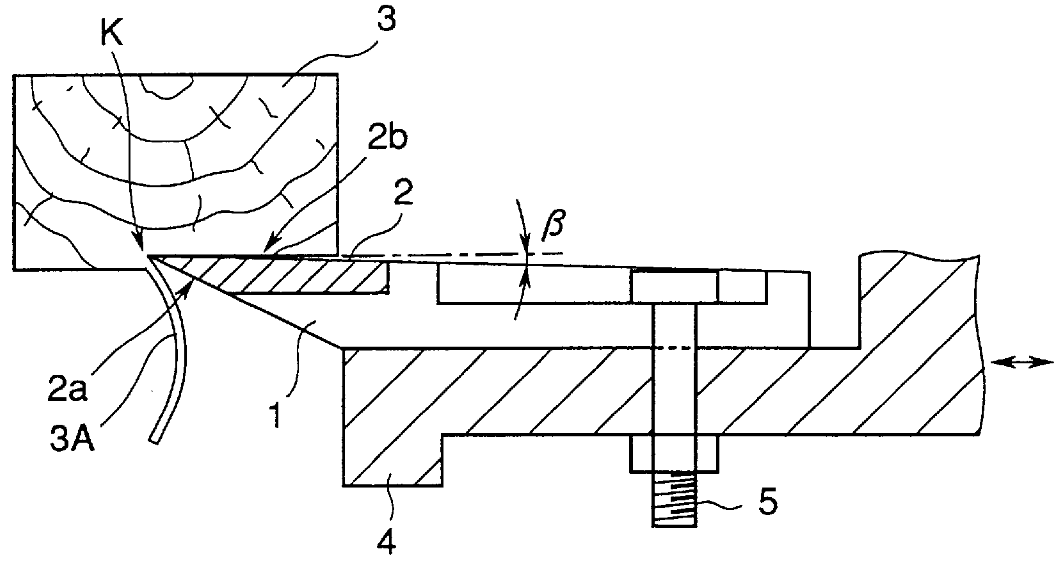
FIG. 1 is a side elevational view showing one embodiment of the present invention.
Figure 2:
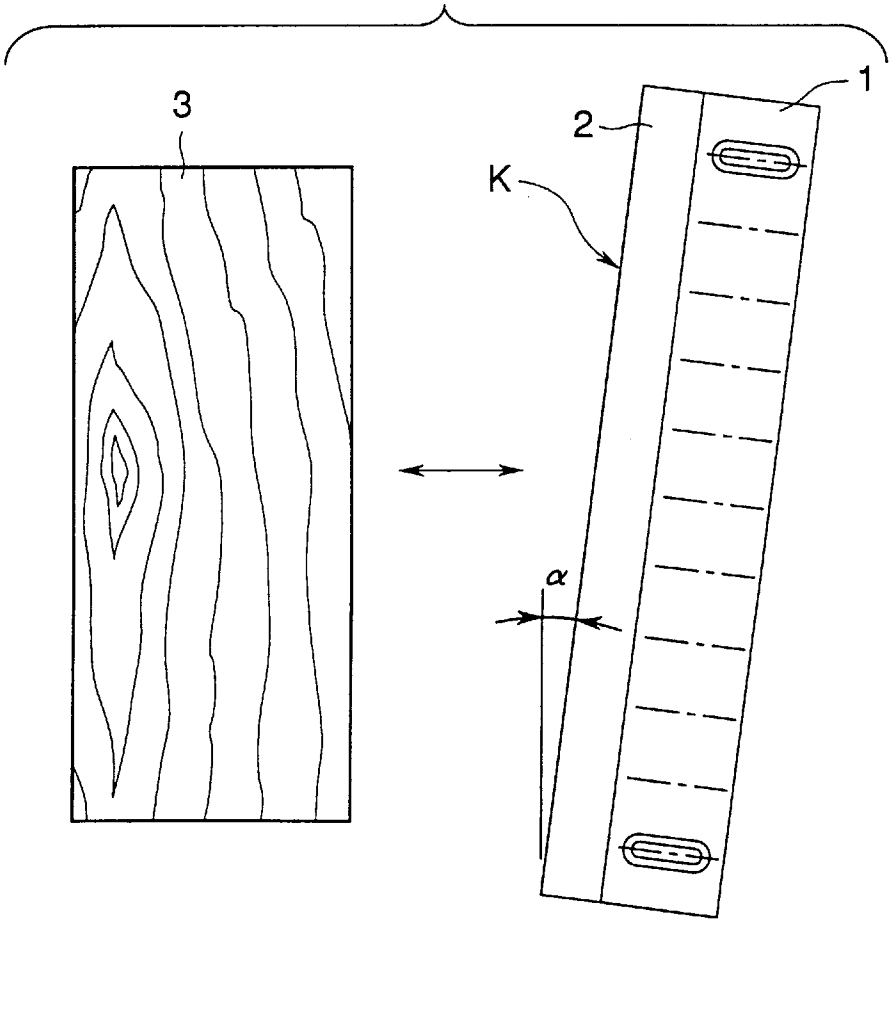
FIG. 2 is a schematic plan view of FIG. 1.
Figure 3:
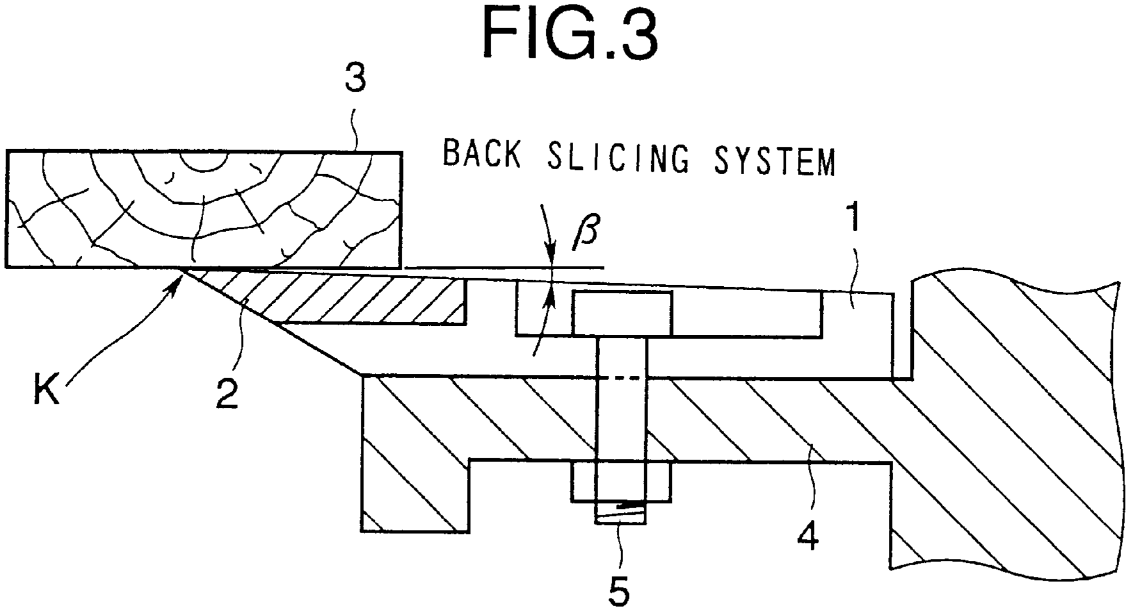
FIG. 3 is a view showing a back slicing system.
Figure 4:
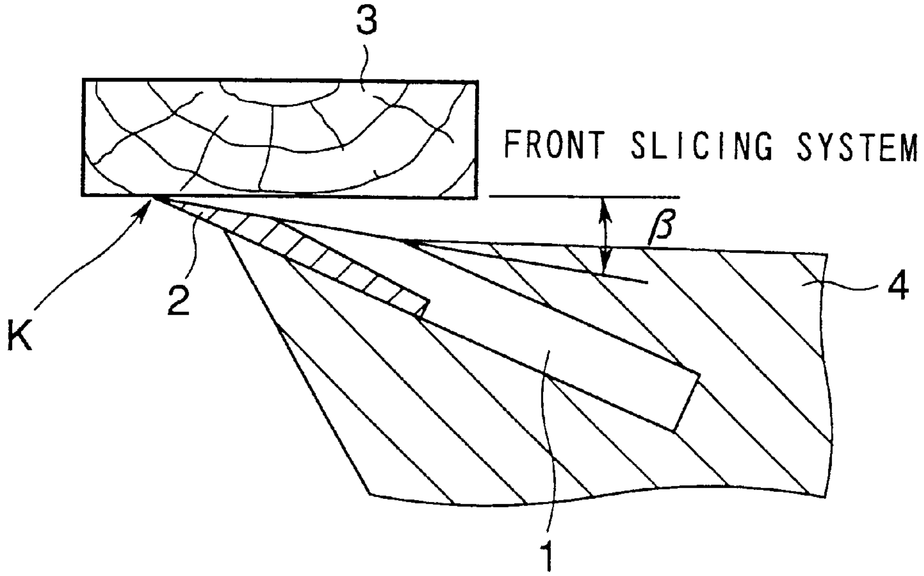
FIG. 4 is a view showing a front slicing system.

One embodiment of the present invention will be described with reference to FIG. 1 and FIG. 2. FIG. 2 is a schematic plan view of FIG. 1. A knife for slicers of the present invention is used to a slicer for slicing a veneer 3A from a wood 3. As shown in FIG. 1 and FIG. 2, the knife for slicer is composed of a flat base steel 1 and a flat edge steel 2 brazed to the base steel 1. The base steel 1 is formed of ferritic stainless steel including improved steel such as SUS 430 (16 Cr–18 Cr). The edge steel 2 is brazed to the base steel 1. The edge steel 2 is formed of alloy tool steel difficult to be rusted including improved steel such as SKD 11, 12, etc. as die steel, high-speed tool steel including improved steel such as SKH 51, 52, etc, a material corresponding to high-speed tool steel, and the like.

The edge steel 2 is brazed after it is heated to the quenching temperature thereof (around 1200° C. in the case of high-speed tool steel) so that it is quenched and brazed at the same time. At the time, since it is required to execute brazing in a furnace having a neutral or reduced atmosphere to prevent the oxidation of the brazed surface of the ferritic stainless steel, the brazing is executed using a copper brazing filler in a nitrogen gas atmospheric furnace having a dew point of −25° C. or less. The brazing may be executed in any heat treatment furnaces such as a hydrogen gas atmospheric furnace, a vacuum furnace and the like so long as they have a neutral or reduced atmosphere, in addition to the nitrogen gas atmospheric furnace. Further, an ordinary copper brazing filler and brazing filler obtained by improving it are used as brazing filler.

More specifically, in the knife for slicers, the base steel 1 is formed of elongated ferritic stainless steel and the edge steel 2 which is formed of alloy tool steel, high-speed tool steel or the material corresponding to high-speed tool steel is brazed to an end portion of a side surface of the base steel 1 along the lengthwise direction thereof using a copper brazing filler in a furnace and then quenched. The flatness of the edge steel 2 is corrected and a front slicing portion 2*a* and a back slicing portion 2*b* are formed to the extreme end of the edge steel 2 as shown in FIG. 1. The section where the front slicing portion 2*a* intersects the back slicing portion 2*b* is made to a slicing edge line K. Next, the other side surface of the base steel 1 apart from the edge steel 2 is abutted against the tool post 4 of a slicer and attached thereto by bolts 5 or the like. At the time, the base steel 1 is attached to the tool post 4 with a swing angle a depending upon a kind of the wood 3 so that the slicing edge line K is tilted with respect to an advancing direction (slicing direction), and the base steel 1 is attached so as to reduce vibration while finely adjusting a slicing edge and setting a clearance angle β. Then, the knife for slicers accurately slices the wood 3 to the veneer 3A having a prescribed thickness by the slicing edge of the edge steel 2 while being reciprocated in the direction of an arrow by a not shown driving mechanism. Further, the wood 3 may be a laminated block composed of a plurality of wood plates with various types of patterns of growth rings which are laminated to each other by an adhesive in a length direction, width direction and thickness direction and a decorated veneer having a wooden mosaic pattern may be made by thinly slicing the laminated block. Although FIG. 1 describes the slicer in which the tool post 4 makes a reciprocating motion, the slicer may be arranged such that the wood 3 is reciprocated by other driving mechanism.

According to the present invention, since the base steel is formed of ferritic stainless steel, the occurrence of rust resulting from the reaction of the base steel with the sap of wood can be prevented as well as the base steel can be held on the electromagnetic chuck by electromagnetic force when a grinding job is executed to the slicing edge because the base steel has magnetism. As a result, a set-up time can be shortened in a grinding job time. Further, since the edge steel is formed of alloy tool steel, high-speed tool steel or the material corresponding to high-speed tool steel, the edge steel can be quenched at the same time when it is brazed. In addition to the above, since the base steel formed of ferritic stainless steel without the hardening property due to quenching is not quenched, the strain-correction of the base steel can be easily carried out. As a result, the flatness of the knife can be improved so that the knife for slicers having an excellent accuracy can be obtained. In addition, when the edge steel is formed of high-speed tool steel or the material corresponding to high-speed tool steel, the durability of the edge steel is improved as compared with an edge steel formed of alloy tool steel. Therefore, the period of time during which the edge steel can used to slicing without being repaired by grinding can be increased and the period of time during which the edge steel can be used without being replaced can be extended, whereby productivity can be increased.

According to the present invention, since the base steel is formed of ferritic stainless steel, a veneer can be prevented from being stained with rust when it is sliced. Even if the base steel is excessively heated up to the quenching temperature of the edge steel, quenching does not harden it. Thus, the strain-correction of the base steel can be easily carried out after heat treatment, whereby there can be obtained the knife for slicers having a high accuracy. Further, when the slicing edge is ground, the base steel can be held on the electromagnetic chuck by electromagnetic force, the grinding job which is often executed to repair the slicing edge can be rationally set up.

What is claimed is:

1. Knives for slicers for slicing a veneer composed of a base steel and an edge steel brazed to the base steel, wherein said base steel is formed of ferritic stainless steel.

2. Knives for slicers according to claim 1, wherein said edge steel is formed of high-speed tool steel or a material corresponding to high-speed tool steel.

* * * * *